(No Model.)
2 Sheets—Sheet 1.

E. J. O'BRIEN.
COTTON SEED LINTER.

No. 413,413. Patented Oct. 22, 1889.

WITNESSES:
W. R. Davis
C. Sedgwick

INVENTOR
E. J. O'Brien
BY Munn & Co.
ATTORNEY (No Model.) 2 Sheets—Sheet 2.

E. J. O'BRIEN.
COTTON SEED LINTER.

No. 413,413. Patented Oct. 22, 1889.

WITNESSES:
W. R. Davis.
C. Sedgwick

INVENTOR
E. J. O'Brien
BY
Munn & Co.
ATTORNEY

UNITED STATES PATENT OFFICE.

EDWARD J. O'BRIEN, OF TEXARKANA, ARKANSAS.

COTTON-SEED LINTER.

SPECIFICATION forming part of Letters Patent No. 413,413, dated October 22, 1889.

Application filed April 3, 1889. Serial No. 305,837. (No model.)

*To all whom it may concern:*

Be it known that I, EDWARD JAMISON O'BRIEN, of Texarkana, in the county of Miller and State of Arkansas, have invented a new and Improved Cotton-Seed Linter, of which the following is a full, clear, and exact description.

This invention relates to cotton-seed linters; and it consists, essentially, of certain improvements upon the cotton-seed linter illustrated, described, and claimed in Letters Patent of the United States, No. 240,170, granted to myself and D. J. O'Keefe on the 12th day of April, A. D, 1881, the object of the present invention being to increase the capacity of the linter without unduly augmenting the amount of power necessary to drive the same.

Reference is to be had to the accompanying drawings, forming a part of this specification, in which similar figures and letters of reference indicate corresponding parts in all the views.

Figure 1:
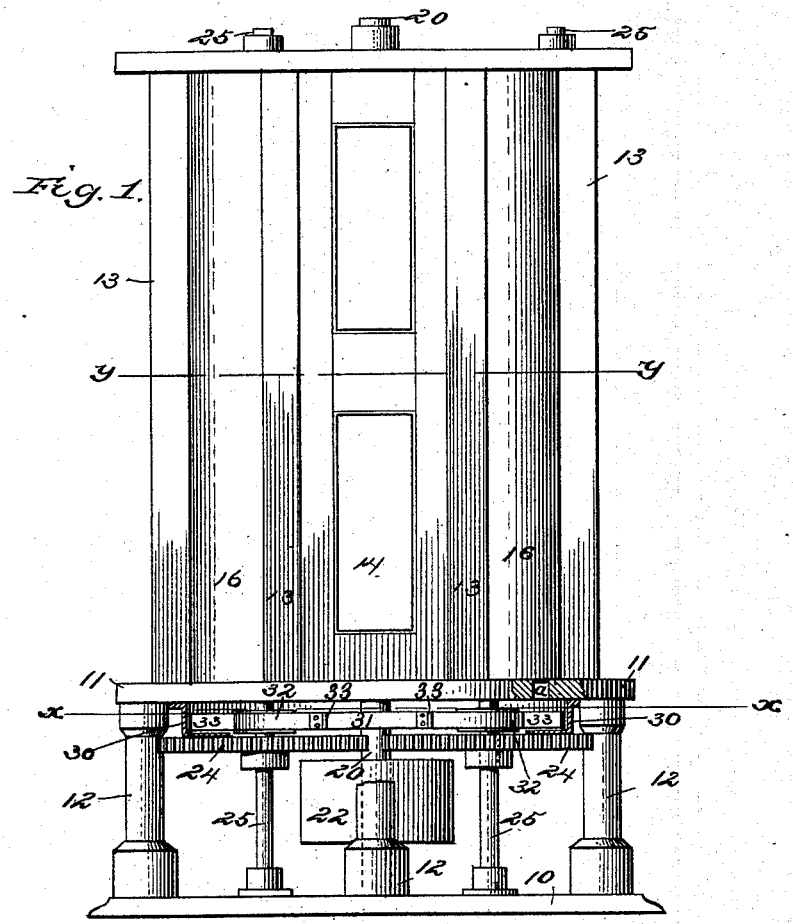
Figure 2:
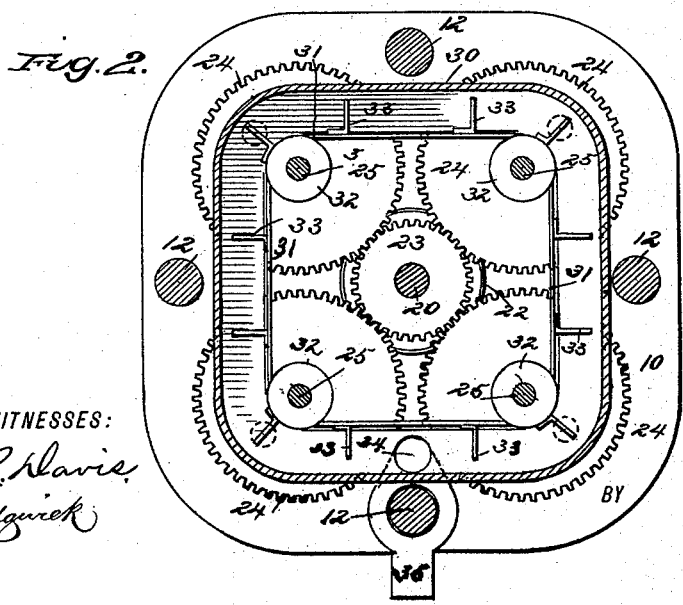
Figure 3:
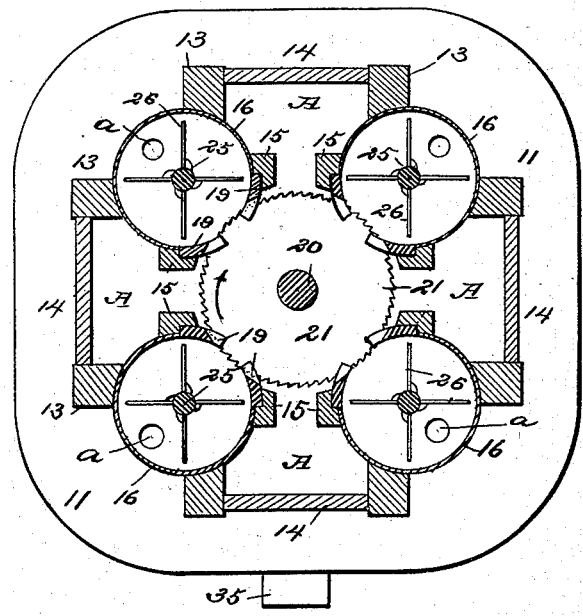
Figure 5:
Figure 4:
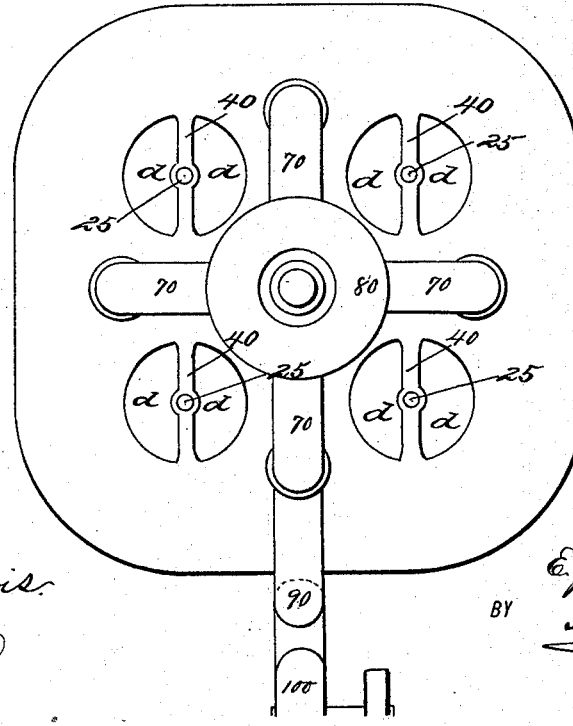

Figure 1 is a side view of my improved cotton-seed linter, parts being broken away. Fig. 2 is a sectional plan view on line $x\ x$ of Fig. 1. Fig. 3 is a sectional plan view on line $y\ y$ of Fig. 1. Fig. 4 is a plan view of the linter, and Fig. 5 is a detail view of a portion of one of the saws.

In constructing the linter forming the subject-matter of this application I provide a base-plate 10, above which there is secured an intermediate plate 11, the plate 11 being supported by posts 12. The plate 11 supports a series of outer posts 13, and between each pair of these posts there is secured a panel 14. Within the posts 13, I arrange other posts 15, which support the inner sides of sheet-iron cylinders 16, said cylinders being also supported by the posts 13.

In the center of the apparatus I mount a shaft 20, which carries a series of saws 21, mounted to revolve in the direction of the arrow shown in Fig. 3, the forward defining edges of the saw-teeth being on radial lines.

As before stated, the edges of the sheet-metal cylinders 16 extend to the posts 15, and these edges abut against combs 19, between the teeth of which the saws 21 extend. The shaft 20 carries a pulley 22 and a gear 23, which said gear 23 engages gears 24, carried by shafts 25, which extend upward through the cylinders 16, and these shafts 25 carry beater blades or arms 26. The plate 11 is formed with apertures $a$, as shown, and these apertures are directly above a trough 30, arranged below the plate 11. In connection with the trough 30, I provide a belt 31, mounted upon pulleys 32, carried by the shafts 25, and this belt 31 carries buckets 33, as shown. The trough 30 has an aperture 34, which leads to a delivery-spout 35. (See Fig. 2.)

In Fig. 4 I show the top plate of the machine, which plate serves to support the upper ends of the shafts 20 and 25, the shafts 25 being supported by bridges 40, the arrangement being such that openings $d$ are left above the cylinder 16.

In operation the cotton-seed is placed within the cylinders, being introduced through the openings $d$. Motion is then imparted to the shaft 20, so that the saws will be carried forward in the direction of the arrow, (shown in Fig 3,) and as the saws so move they will gather the lint from the seed, which lint may be removed by passing currents of air through the lint-chambers, which are formed between the cylinders 16, said lint-chambers being shown at A. As the seed is cleaned it passes outward through the apertures $a$ into the trough 30, to be carried forward within said trough to the spout 35 by the buckets of the belt 31.

In Fig. 4 is shown in dotted lines one way by which a current of air may be passed through the lint-chambers to remove the lint. In said figure 80 represents a central circular pipe from which lead pipes 70 to the lint-chambers. With one of the pipes 70 is connected a pipe 90, that leads to a fan 100.

Although I prefer to employ blasts in the chambers A, I have found that very satisfactory work may be done without the blasts, owing to the fact that the lint will be carried from the saws by the centrifugal force generated by the revolution of such saws.

By mounting the saw-carrying shaft as above described I provide for an equal distribution of the work, and I am enabled to clean a much greater quantity of cotton-seed with a very slight increase of power over that necessary to run the old form of machine.

Having thus described my invention, I claim as new and desire to secure by Letters Patent—

1. The combination, with two or more cotton-seed-receiving chambers, of a vertical shaft, saws carried thereby, agitators arranged within the cotton-seed-receiving chambers, and means for driving the agitators, substantially as described.

2. In a cotton-seed linter, the combination, with a structure including lint-chambers A and chambers arranged to receive cotton-seed, of a central saw-carrying shaft, saws carried by the shaft and arranged to enter the cotton-seed receiving-chambers, a trough arranged beneath the cotton-seed receiving-chambers, an endless belt provided with wings which enter said trough, and a means for driving the belt, as and for the purpose stated.

3. In a cotton-seed linter, the combination, with a structure containing chambers A, and other chambers adapted to receive cotton-seed, of shafts mounted within the cotton-seed receiving chambers, blades or arms carried by said shafts, a central shaft, a series of saws carried thereby, a trough arranged beneath the cotton-seed chambers, communication being established between the trough and the chambers, an endless carrier-belt, wings carried by said belt and arranged to enter the trough, a delivery-spout, and driving mechanism, substantially as described.

EDWARD J. O'BRIEN.

Witnesses:
HENRY BROWN,
JNO. A. BUCHANAN.